United States Patent
Jarvis et al.

(10) Patent No.: US 10,029,502 B2
(45) Date of Patent: *Jul. 24, 2018

(54) METHOD OF FORMING AN IMAGE ON A SUBSTRATE

(71) Applicant: DataLase Ltd., Widnes (GB)

(72) Inventors: Anthony N. Jarvis, Widnes (GB); Christopher Anthony Wyres, Widnes (GB); William Green, Widnes (GB); Martin Robert Walker, Widnes (GB)

(73) Assignee: DataLase Ltd., Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,193

(22) Filed: Aug. 14, 2017

(65) Prior Publication Data

US 2017/0341448 A1 Nov. 30, 2017

Related U.S. Application Data

(63) Continuation of application No. 14/357,368, filed as application No. PCT/GB2012/052753 on Nov. 6, 2012, now Pat. No. 9,731,533.

(30) Foreign Application Priority Data

Nov. 10, 2011 (GB) .................................. 1119410.7
May 29, 2012 (GB) .................................. 1209466.0

(51) Int. Cl.
| | | |
|---|---|---|
| *B41M 5/34* | (2006.01) | |
| *B41M 5/28* | (2006.01) | |
| *B32B 27/32* | (2006.01) | |
| *B32B 27/36* | (2006.01) | |
| *G03C 1/73* | (2006.01) | |
| *B32B 7/06* | (2006.01) | |
| *B32B 7/12* | (2006.01) | |
| *B32B 27/10* | (2006.01) | |
| *C09D 11/50* | (2014.01) | |
| *C09J 7/29* | (2018.01) | |

(52) U.S. Cl.
CPC ................. *B41M 5/34* (2013.01); *B32B 7/06* (2013.01); *B32B 7/12* (2013.01); *B32B 27/10* (2013.01); *B32B 27/32* (2013.01); *B32B 27/36* (2013.01); *B41M 5/28* (2013.01); *B41M 5/285* (2013.01); *C09D 11/50* (2013.01); *C09J 7/29* (2018.01); *G03C 1/73* (2013.01); *B32B 2255/10* (2013.01); *B32B 2255/12* (2013.01); *B32B 2255/26* (2013.01); *B32B 2255/28* (2013.01); *B32B 2307/4023* (2013.01); *B32B 2307/4026* (2013.01); *B32B 2307/412* (2013.01); *B32B 2307/75* (2013.01); *B32B 2519/00* (2013.01); *B32B 2554/00* (2013.01); *B41M 2205/04* (2013.01); *B41M 2205/24* (2013.01); *B41M 2205/42* (2013.01)

(58) Field of Classification Search
CPC .. G03C 1/73; G03C 1/732; G03C 1/95; H01L 27/28; H01L 27/307; B41M 5/28; B41M 5/284; B41M 5/285
See application file for complete search history.

(56) References Cited

U.S. PATENT DOCUMENTS

| | | |
|---|---|---|
| 4,698,296 A | 10/1987 | Lewis |
| 5,210,064 A | 5/1993 | Baker et al. |
| 5,672,465 A | 9/1997 | Patel |
| 5,977,019 A | 11/1999 | Ozeki et al. |
| 9,731,533 B2 * | 8/2017 | Jarvis ...................... B32B 27/32 |
| 2003/0180660 A1 | 9/2003 | Khan |
| 2003/0186001 A1 | 10/2003 | Khan |
| 2005/0208290 A1 | 9/2005 | Patel |
| 2006/0040217 A1 | 2/2006 | Stubbs |
| 2007/0211135 A1 | 9/2007 | Moreland |
| 2009/0023585 A1 | 1/2009 | Wyres |
| 2009/0071367 A1 | 3/2009 | Campbell |
| 2009/0117353 A1 | 5/2009 | Stubbs |
| 2010/0239642 A1 | 9/2010 | Campbell |
| 2010/0296127 A1 | 11/2010 | Barndt |
| 2011/0104459 A1 | 5/2011 | Arora et al. |
| 2011/0106035 A1 | 5/2011 | Arora |
| 2011/0122347 A1 | 5/2011 | Jarvis |
| 2011/0136934 A1 | 6/2011 | Jarvis |
| 2011/0148092 A1 | 6/2011 | Jarvis |
| 2011/0151384 A1 | 6/2011 | Walker |
| 2012/0021362 A1 | 1/2012 | Jarvis |
| 2014/0160221 A1 | 6/2014 | Cridland |

FOREIGN PATENT DOCUMENTS

EP        0709225        5/1996

* cited by examiner

*Primary Examiner* — David Banh
(74) *Attorney, Agent, or Firm* — Saliwanchik, Lloyd & Eisenschenk

(57) ABSTRACT

A method of forming an image on a substrate by applying energy, involves a substrate in or on which there are at least two different colour-change agents, i.e. a first colour-change agent capable of giving rise to at least two different colours; and a second colour-change agent capable of giving rise to at least one different colour than achievable with the first colour change agent. A preferred embodiment of the invention is a multi-layer laminate comprising, in order, a layer comprising the first agent, a barrier layer, and a layer comprising the second agent.

15 Claims, No Drawings

METHOD OF FORMING AN IMAGE ON A SUBSTRATE

CROSS-REFERENCE TO RELATED APPLICATIONS

The present application is a continuation application of U.S. application Ser. No. 14/357,368, filed May 9, 2014, which is a national stage application of International Application No. PCT/GB2012/052753, filed Nov. 6, 2012, which claims priority to Great Britain Application No. 1119410.7, filed Nov. 10, 2011 and Great Britain Application No. 1209466.0, filed May 29, 2012, the disclosures of which are incorporated herein by reference in their entirety, including any figures, tables, and drawings.

FIELD OF THE INVENTION

This invention relates to a method of forming an image on a substrate.

BACKGROUND OF THE INVENTION

Diacetylenes are compounds that can be represented by the formula R—C≡C—C≡C—R. The ability of diacetylenes to give rise to visibly coloured polydiacetylenes is known. Polydiacetylenes often exhibit polychromism, i.e. they can display more than one visibly distinct colour. Typically, when exposed to UV light, a diacetylene initially gives rise to a blue coloured polydiacetylene. Heating the blue polydiacetylene induces thermal perturbations into the polydiacetylene backbone that converts it into a red coloured form. Further heating of the red polydiacetylene will often produce a yellow polydiacetylene, but this species is usually transient and will revert to the red form upon cooling. Even though diacetylenes can be used in multi-colour imaging applications, they usually lack the ability to produce yellow and consequently orange and in particular green shades, and therefore true full-colour imaging is not possible.

SUMMARY OF THE INVENTION

One aspect of the present invention is a method of forming an image on a substrate by applying energy thereto, wherein there are in or on the substrate at least two different colour-change agents, i.e.
  a. a first colour-change agent capable of giving rise to at least two different colours; and
  b a second colour-change agent capable of giving rise to at least one different colour than achievable with the first colour change agent.

In another aspect of the invention, a substrate suitable for multi-colour imaging comprises at least two colour-forming coating layers, wherein the first colour-forming layer is capable of giving rise to blue and red colours, and the second colour-forming layer is capable of giving rise to a visible colour other than blue or red, such as yellow, cyan, magenta, black and/or green.

In a particular embodiment, there is a third colour-forming agent, capable of giving rise to a visible colour other than that arising from the first and second agents, e.g. other than blue, red or yellow, such as cyan. This may be provided in a third layer.

It has surprisingly been found that when the first blue and red colour-forming layer comprises a diacetylene compound and the other colour-forming layer comprises a specific thermal acid generator (TAG) in combination with a yellow leuco dye, full colour images can be produced, e.g. magenta, cyan and yellow or, preferably, blue, red and green. It has also surprisingly been found that the blue and red colour-forming diacetylene compound can be activated independently of the yellow TAG/leuco dye layer and also that the colours obtained are stable. This may be due to the relatively high power yellow colour formation causing deactivation of the diacetylene compound, either chemically or physically.

In yet another aspect of the invention, a multi-layer laminate comprises, in order, a first layer comprising a first colour-change agent, a second layer of a plastics or other barrier material, and a third layer comprising a second colour-change agent, wherein the first and second agents are as defined above.

In use of such a multi-layer laminate, energy can be applied to the first and third layers independently, thereby forming the same or different images on opposite sides of the laminate.

DESCRIPTION OF THE INVENTION

The first colour-change agent used in the invention is preferably a diacetylene compound, i.e. a compound that comprises a diacetylene group and can be represented as R—C≡C—C≡C—R. Preferred diacetylenes can undergo topochemical polymerisation reactions to give polydiacetylenes that are visibly coloured. Particularly preferred diacetylene compounds are those that are activatable. These are diacetylenes that exist in more than one form with regards to their polymerisability. Particularly preferred are those that can exist both in a form unreactive to UV light and a form reactive to UV light. Typically, the transformation between these forms can be made by heating the compound above a certain activation point. This transformation can be either irreversible or reversible. More preferred activatable diacetylenes give rise to at least two visibly distinct polydiacetylenes, such as a blue form upon exposure to UV light and then a red form upon heating. Further preferred diacetylene compounds are deactivated, i.e. they become incapable of undergoing a colour-change reaction, either chemically or physically, at the energy levels required to cause the second and any third colour-change agent to change colour. The most preferred diacetylenes are derivatives of diacetylene mono and di-carboxylic acids that can be represented by the following general formula:

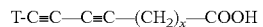

x=1 to 20;
T=H, a saturated hydrocarbon alkyl chain, or —(CH$_2$)$_y$—COOH, where y=1 to 20.

Particularly preferred are derivatives of 10,12-pentacosadiynedioic and 10,12-docosadiynedioic acid.

Examples of suitable derivatives include mono and bis-amides and esters. The most preferred derivatives are amides. Examples of preferred amide derivatives can be represented by the following general formula:

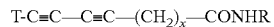

x=1 to 20; and
T=H, a saturated hydrocarbon alkyl chain, or —(CH$_2$)$_y$—CONHR', where y=1 to 20;
R and R' are H, or an alkyl chain that can be unsaturated or saturated, as represented by the formula $C_nH_{2n+1}$ where n is 1 to 30.

The unsaturated or saturated chains can be straight or branched or a ring system. The chains can also comprise substituents or groups known in organic chemistry such as —OH, and also heteroatoms.

Preferred examples of straight alkyl chains are those comprising 6 to 22 carbon atoms, and more preferred are those in this range having an even number of carbon atoms, such as hexyl, octyl, decyl, dodecyl, tetradecyl, hexadecyl, octadecyl, icosyl or docosyl chains. Also preferred are unsaturated chains such as propargyl and oleyl chains. A preferred ring system is a cyclopropyl group.

The diacetylene compounds of the invention are amides. It is possible that the amide group can be replaced by another linking group such as, ester, thioester, ether, thioether, carbonyl, urethane, urea, thiourea, amine etc. There may be more than one such group.

As indicated above, the colour-change agents may be applied on a substrate in separate layers. If a first layer comprises a diacetylene, another layer can comprise any known colour-generating system. If the diacetylene layer comprises a diacetylene that gives rise to blue and red, it is preferred that the other layer comprises either a yellow, cyan, magenta, black or green-generating system. If the system comprises three colour-generating layers, the first layer comprises a diacetylene that gives rise to blue and red, and the second layer comprises a yellow colour-generating system, it is preferred that the third layer comprises a cyan colour-generating system, as activating yellow and cyan simultaneously will give rise to green colours.

Suitable chemistries for the other layer(s) include other diacetylenes, particularly activatable diacetylenes that only give rise to yellow, cyan or green colours; charrables; transition metal oxyanions such as molybdates; and charge transfer complexes. Particularly preferred are leuco dyes, including the photochromic and halochromic types. Examples of photochromic leuco dyes include spiroxazines and naphthopyrans. Examples of halochromic types include phthalides, fluorans, triarylmethanes, benzoxazines, quinazolines, spiropyrans, quinones, thiazines, and oxazines.

If the leuco dye is halochromic, it is preferably used in combination with an acid or base-generating agent. Acid-generating agents are preferred, in particular thermal acid-generating agents (TAGs). These are species that liberate acid when heated. Any TAG may be used in the present invention, but it is preferred to use a TAG that requires significantly more energy to undergo a colour-change reaction than that needed to activate the diacetylene compound, and thereby allows the second colour change reaction to take place whilst causing the diacetylene compound to become deactivated and incapable of undergoing colour change reactions. Preferred examples of suitable TAGs are disclosed in WO2006/108745, WO2007/088104, WO2008/110487, WO2009/010393, and WO2010/049281. More preferred examples are the TAGs based on amines salt of organo-boron and organo-silicon complexes as disclosed in WO2006/108745. Examples of such TAGs include tri-n-butylammonium borodibenzilate and tri-n-butylammonium borodisalicylate.

The layers can be applied to any suitable substrate. Examples include paper, corrugated paperboard, cardboard, polymer films, such as PET, PE and PP, particularly BOPP films, cellulose films, ridged 3-D plastics articles, metals and metal foils, textiles, foodstuffs and pharmaceutical preparations.

Each layer can be applied using an ink formulation which can be a liquid and based on, e.g. water or organic solvents or a mixture of the two. The ink can be applied using any suitable coating technique. The ink preferably also comprises a binder. The binder can be any suitable binder. Preferably, the binder is a polymeric binder. Examples of suitable polymeric binders includes acrylic polymers, styrene polymers and hydrogenated products thereof, vinyl polymers, polyolefins and hydrogenated or epoxidised products thereof, aldehyde polymers, epoxide polymers, polyamides, polyesters, polyurethanes, sulphone-based polymers and natural polymers and derivatives thereof. The polymeric binder can also be a mixture of polymeric binders.

Other possible components in the ink formulations include polymers, light/energy absorbing agents, UV absorbers such as 2-hydroxy-4-methoxybenzophenone, surfactants, wetting agents, drying promoters, colourants such as traditional dyes and pigments, tinting agents, fluorescent agents, plasticisers, optical brighteners, oxidizing or reducing agents, stabilizers, light stabilizing agents such as hindered amines, rheology modifiers such as thickening or thinning agents, humectants, solvents, adhesion promoters, acid or base scavenging agents or retarders.

The diacetylene-containing layer can be the upper or lower layer, or the middle layer of a three-layer system. However, it is also possible for two or more of the colour-change chemistries to be in the same coated layer. Further, it is possible for at least one of the colour-change chemistries to be embedded directly into the substrate rather than coated onto the surface.

The substrate can also additionally comprise at least one non-colour-forming layer. Such a layer can comprise other additives such energy-absorbing agents or just binder. A non-colour-forming layer, if present, can be above, below or sandwiched between the imaging layers. The non-colour-forming layer can be applied as a liquid ink or varnish system or as a film laminate or barrier layer.

In a multi-layer laminate of the invention, the barrier layer is typically of a plastics material, particularly a flexible plastics film material such as PP, PET or PE. The barrier layer can be transparent or opaque to all wavelengths of light, or just to particular wavelengths of light such as UV, visible and IR such as near or mid-IR. The flexible plastic film/barrier layer can be of thickness in the range 1 micron to 500 microns, preferably 10 microns to 100 microns, and more preferably still 20 microns to 60 microns. The flexible plastic film/barrier layer can also comprise adhesive and optionally thereon a release layer. This barrier layer provides several advantageous features.

For example, the respective layers may be of a blue/red-generating diacetylene, a barrier, a yellow leuco dye (YLD) and, if desired, a substrate beneath the YLD layer. Irradiation through the barrier causes colouration of the YLD; low level activation gives a pale yellow, while higher level activation gives a dark yellow and, by heat transfer, causes the diacetylene to change colour. In a specific example, yellow and cyan-type blue provides green.

Activation/imaging can be carried out using any suitable system that can apply energy to the substrate. The energy can be direct heat as applied by a thermal print head, or radiation such as light. The radiation can be broadband or mono-chromatic, coherent or non-coherent. The radiation can in the wavelength range 100 nm to 32 microns. It can be supplied by a light emitting diode or a lamp that emits UV, visible or IR radiation, or by a laser such as a UV, visible, or IR laser. The IR laser can be a mid-IR $CO_2$ laser or a near-IR Nd:YAG or fibre laser operating with an emission wavelength in the range 700 nm to 2500 nm. The light sources can be a single source such as a steered beam system or an array of sources.

The substrate and/or the ink formulations can also comprise at least one NIR-absorber. Such a material is preferred if the imaging system comprises a NIR laser with an emission wavelength in the range 700 nm to 2500 nm. Any suitable NIR-absorber can be used. It is preferred if the absorbance profile or □max of the NIR-absorber approximately matches the emission wavelength of the laser. More preferred NIR-absorbers have negligible impact on the background colour of the substrate. The most preferred NIR-absorbers include: inorganic copper salts such as copper (II) hydroxyl phosphate; organic NIR dyes and pigments, such as N,N,N,'N'-tetrakis(4-dibutylaminophenyl)-p-benzoquinone bis(iminium hexafluoro-antimonate; non-stoichiometric inorganic compounds, such as reduced indium tin oxide, reduced zinc oxide, reduced tungsten oxides, reduced antimony tin oxide, or doped metal oxides such as AZO and FTO; and conductive polymers such as PEDOT. The substrate and/or the ink formulations can also comprise more than one NIR absorber each with a different absorbance profile, so as to give activatability/imaging using NIR lasers of different wavelengths.

The following Examples illustrate the invention.

EXAMPLE 1

Dual Layer Blue/Red Upper and Yellow Lower

1. Activatable Diacetylene Blue and Red-Generating Ink
An ink formulation was made comprising:

| | |
|---|---|
| Joncryl LMV7085 (binder) | 150 g |
| Water | 150 g |
| Dispelair CF49 (defoamer) | 2.0 g |
| Agitan 350 (defoamer) | 2.0 g |
| Dispex A40 (dispersing agent) | 4.0 g |
| r-ITO (NIR absorber) | 25 g |
| 10,12-DDA bis(tetradecylamide) (activatable blue and red colour-change agent) | 100 g |
| Joncryl 8052 (binder) | 345 g |
| Joncryl 8064 (binder) | 150 g |
| Tyzor LA (adhesion-promoter) | 10 g |
| Tinuvin 1130 (light-stabilizing agent) | 25 g |
| Tinuvin 292 (light-stabilizing agent) | 12 g |
| Isopropanol (retarder) | 25 g |

The ink was prepared by bead milling.
2. TAG/Leuco Dye Yellow-Generating Ink
An ink formulation was made comprising:

| | |
|---|---|
| Water | 79 g |
| Joncryl LMV7085 (binder) | 150 g |
| Dispex A40 (dispersing agent) | 2 g |
| Dispelair CF49 (defoamer) | 10 g |
| Diethylene glycol | 20 g |
| BYK-348 (surfactant) | 4.0 g |
| r-ITO(NIR absorber) | 25 g |
| Yellow Leuco dye | 170 g |
| Tri-n-butylammonium borodisalicylate (TAG) | 240 g |
| Joncryl 8064 (binder) | 200 g |

The ink was prepared by bead milling.

The yellow colour-forming ink was then applied to a white paper-based substrate using a flexographic printing process and dried, to yield a layer with a coat weight of approximately 4-5 g.m$^{-2}$. The blue/red colour-forming diacetylene ink was then applied on top of the yellow layer, also using a flexographic printing process, and dried to yield a layer with a dry coat weight of approximately 6-10 g.m$^{-2}$.

A $CO_2$ (10.6 micron wavelength) laser was then used at low power (approximately <1 J.cm$^{-2}$) to activate the diacetylene layer. Exposing the substrate to 266 nm UV light produced a blue image, but only in the region previously exposed to the $CO_2$ radiation. Further exposure of the blue image to low power $CO_2$ (approximately 1 J.cm$^{-2}$) produced a magenta image. The magenta image was then turned into a red image by further exposure to $CO_2$ laser radiation (approximately 1 J.cm$^{-2}$). Exposure of the unactivated substrate to high power $CO_2$ (approximately 3 J.cm$^{-2}$) produced a yellow image. A green colour was obtained by micro-imaging of side-by-side blue and yellow dots or lines, and an orange image was obtained by activating yellow over red.

The yellow images created above were exposed to 254 nm broadband, non-coherent UV light and produced a negligible further colour change, indicating that the high fluence had deactivated or removed essentially most of the diacetylene colour-former.

The above imaging was then performed using a 1550 nm fibre laser in place of the $CO_2$ laser, and a similar result obtained.

EXAMPLE 2

Triple Layer—Blue/Red Upper, Yellow Middle and Cyan Lower

Three ink formulations were prepared, each by bead-milling.
1. Cyan Colour-Forming Leuco Dye/TAG Ink:

| | |
|---|---|
| Joncryl ECO 675N ammonia neutralised (ex. BASF, binder) | 320 g |
| Texicryl S02N ammonia neutralised (ex. Scott-Bader) | 300 g |
| Water | 120 g |
| Dispelair CF49 | 10 g |
| Pergascript Blue I-2RN (ex. BASF, cyan leuco dye) | 50 g |
| Tri-n-butylammonium borodisalicylate (TAG) | 200 g |

2. Yellow Colour-Forming Leuco Dye/TAG Ink:

| | |
|---|---|
| Joncryl ECO 675N ammonia neutralised (ex. BASF, binder) | 320 g |
| Texicryl S02N ammonia neutralised (ex. Scott-Bader) | 300 g |
| Water | 120 g |
| Dispelair CF49 | 10 g |
| Pergascript Yellow I-3R (ex. BASF, yellow leuco dye) | 50 g |
| Tri-n-butylammonium borodisalicylate (TAG) | 200 g |

3. Blue and Red Colour-Forming Diacetylene Ink:

| | |
|---|---|
| Joncryl LMV 7085 | 150 g |
| Water | 85 g |
| Dispelair CF49 | 1.0 g |
| Agitan 350 | 1.0 g |
| Dispex A40 | 3.5 g |
| r-ITO | 25 g |
| 10,12-Docosadiynedioic acid bis(propargylamide) | 150 g |
| Paranol T-6320 | 215 g |
| Water | 64.5 g |
| Joncryl 8052 | 215 g |
| Isopropanol | 40 g |
| Tinuvin 1130 | 30 g |
| Tinuvin 292 | 20 g |

The cyan colour-forming ink was applied to a white paper-based substrate using a flexographic printing process and dried, to yield a coat weight of approximately 4-5 g.m$^{-2}$. The yellow colour-forming ink was then applied on top of the cyan colour-forming layer, also using a flexographic printing process, and dried to yield a layer with a coat weight of approximately 4-5 g.m$^{-2}$. The blue/red colour-forming diacetylene ink was then applied on top of the yellow layer, also using a flexographic printing process, and dried, to yield a layer with a dry coatweight of approximately 6-10 g.m$^{-2}$.

Full colour imaging was then performed using UV and NIR lasers with emission wavelengths of 266 nm and 1550 nm, as follows. The diacetylene layer was activated using 1550 nm light at approximately 1 J.cm$^{-2}$. 266 nm laser light was then used to convert the areas previously activated into blue images. The 1550 nm light was then used to convert the blue images into magenta and red images using fluence values in the region 1-2 J.cm-2. Yellow images were then created in unimaged regions of the substrate using the 1550 nm light at approximately 5 J.cm$^{-2}$. Green images were then produced by activating the cyan and exposing the yellow or unactivated regions to 1550 nm light with a fluence of approximately 10 J.cm$^{-2}$.

Coloured squares with the following CIELAB coordinate were obtained (D65, 10°)

|  | L* | a* | b* |
|---|---|---|---|
| Pink | 66.64 | 33.32 | 6.67 |
| Red | 50.91 | 57.48 | 32.41 |
| Orange | 67.99 | 38.81 | 40.59 |
| Yellow | 84.60 | −4.16 | 59.22 |
| Green 1 | 75.31 | −1.75 | 91.18 |
| Green 2 | 65.73 | −6.08 | 79.12 |
| Green 3 | 63.48 | −7.58 | 83.16 |
| Blue 1 | 76.28 | −13.96 | −1.48 |
| Blue 2 | 46.75 | −7.85 | −26.94 |
| Purple | 13.05 | 30.32 | −35.38 |

EXAMPLE 3

Triple Layer—Blue/Red Upper, Yellow Middle and Cyan Lower with 'Clear Sandwich Film' Barrier Layer Between the Blue Red and Yellow Layers The inks prepared in Example 2 were applied to a substrate. More particularly, the cyan colour-forming ink was applied to a white paper-based substrate using a flexographic printing process and dried to yield a layer with a coat weight of 4-5 g.m$^{-2}$. The yellow colour-forming ink was then applied on top of the cyan colour-forming layer, also using a flexographic printing process, and dried, to yield a layer with a dry coat weight of 4-5 g.m$^{-2}$.

A layer of self-adhesive clear polyester film (PET), approximately 36 microns thick, was then laid on top of the yellow layer. The blue/red colour-forming diacetylene ink was then applied on top of the polyester film layer, also using a flexographic printing process, and dried, to yield a layer with a coat weight of 6-10 g.m$^{-2}$.

Full colour imaging was then performed using 266 nm, 405 nm and 1550 nm laser light, as follows: The diacetylene layer was activated using 1550 nm light at approximately 1 J.cm$^{-2}$. A 266 nm laser light was then used to convert the areas previously activated into blue images. The 1550 nm light was then used to convert the blue images into magenta and red images, using fluence values in the region 1-2 J.cm$^{-2}$. Yellow images were then created in unimaged regions of the substrate using the 405 nm light at approximately 5 J.cm$^{-2}$. Green images were then produced by exposing the yellow or unactivated regions to 405 nm light with a fluence of approximately 10 J.cm$^{-2}$.

EXAMPLE 4

Dual Layer—Blue/Red with Cyan Upper, and Yellow Lower

The following ink blue/red diacetylene and cyan leuco dye/TAG ink was created:

| Joncryl LMV 7085 | 150 g |
|---|---|
| Water | 155 g |
| Dispelair CF49 | 1.0 g |
| r-ITO | 20 g |
| 10,12-Docosadiynedioic acid bis(propargylamide) | 110 g |
| Pergascript Blue I2RN | 133 g |
| SABoTBA | 53.3 g |
| Paranol T-6320 | 203 g |
| Joncryl 8052 | 200 g |
| Isopropanol | 40 g |
| Tinuvin 1130 | 30 g |
| Tinuvin 292 | 20 g |

The ink was prepared by bead milling.

The yellow leuco dye/TAG ink as prepared in Example 2 was applied to a white paper based substrate using a flexographic printing process and dried, to yield a layer with a coat weight of 4-5 g.m$^{-2}$. The above blue/red and cyan ink was then applied on top of the yellow-forming layer using a flexographic printing process and dried, to yield a layer with a coat weight of 6-10 g.m$^{-2}$.

Full colour imaging was then performed using 266 nm and 1550 nm laser light, as follows. The diacetylene layer was activated using 1550 nm light at approximately 1 J.cm$^{-2}$. 266 nm laser light was then used to convert the areas previously activated into blue images. The 1550 nm light was then used to convert the blue images into magenta and red images using fluence values in the region 1-2 J.cm$^{-2}$. Yellow images were then created in unimaged regions of the substrate using the 1550 nm light at approximately 5 J.cm$^{-2}$. Green images were then produced by exposing the yellow or unactivated regions to 1550 nm light with a fluence of approximately 10 J.cm$^{-2}$.

EXAMPLE 5

Dual Layer—Blue/Red with Cyan Upper, and Yellow Lower with 'Clear Sandwich Film' Barrier Layer Between the Blue/Red with Cyan and Yellow Layers The yellow colour-forming ink as prepared in Example 2 was applied to a white paper-based substrate using a flexographic printing process and dried, to yield a layer with a coat weight of 4-5 g.m$^{-2}$. A layer of self-adhesive clear polyester film (PET), approximately 36 microns thick, was then laid on top of the yellow layer. The blue/red with cyan colour-forming ink as prepared in Example 4 was then applied on top of the polyester film and dried to give a layer with a coat weight of 6-10 g.m$^{-2}$.

Full colour imaging was then performed using 266 nm, 405 nm and 1550 nm laser light, as follows: The diacetylene layer was activated using 1550 nm light at approximately 1 J.cm$^{-2}$. 266 nm laser light was then used to convert the areas previously activated into blue images. The 1550 nm light was then used to convert the blue images into magenta and red images using fluence values in the region 1-2 J.cm$^{-2}$. Yellow images were then created in unimaged regions of the substrate using the 405 nm light at approximately 5 J.cm$^{-2}$. Green images were then produced by activating the cyan layer over the yellow image using 405 nm light at approximately 10 J.cm$^{-2}$.

The invention claimed is:
1. A method of forming an image on a substrate in or on which there are at least two different colour-change agents, wherein the at least two different colour change agents comprise:

a first colour-change agent that is an activatable diacetylene capable of giving rise to at least two different colours; and a second colour-change agent that comprises a thermal acid generator and a yellow leuco dye and is capable of giving rise to at least one different colour than achievable with the first colour change agent;

wherein the method comprises applying energy to the substrate to generate an image, wherein the at least two different colours to which the first colour-change agent is capable of giving rise comprise blue and red, and wherein the second colour-change agent is capable of giving rise to the colour yellow.

2. The method according to claim 1, wherein the first and second colour-change agents are capable of generating colour independently of each other.

3. The method according to claim 1, wherein the thermal acid generator is an amine salt of an organo-boron or organo-silicon complex.

4. The method according to claim 1, wherein the energy required to activate the first colour-change agent causes no or substantially no colour-change reaction in the second colour-change agent.

5. The method according to claim 1, wherein the energy required to cause the second colour-change agent to change colour causes the first colour-change agent to become essentially permanently deactivated with respect to any further colour-change reaction.

6. The method according to claim 1, wherein an energy-absorbing agent is also included in or on the substrate.

7. The method according to claim 6, wherein the energy-absorbing agent absorbs radiation having a wavelength in the range 200 nm to 410 nm or 700 nm to 2500 nm.

8. The method according to claim 1, wherein the at least two different colour change agents further comprise a third colour change agent, wherein the third colour-change agent is capable of forming a colour different from those of the first and second colour-change agents.

9. The method according to claim 8, wherein the first and second colour-change agents are in first and second layers, respectively, on the substrate, and wherein the third colour-change agent is in a third layer.

10. The method according to claim 9, wherein the first, second, and third colour-forming agents comprise a blue and red colour-forming agent, a yellow colour-forming agent, and a cyan colour-forming agent.

11. The method according to claim 1, wherein the energy comprises radiation having a wavelength in the range 100 nm to 32 microns.

12. The method according to claim 11, wherein the radiation is supplied by a lamp, laser or diode, or an array thereof.

13. A substrate, comprising: a first colour-change agent on or in the substrate; and a second colour-change agent on or in the substrate, wherein the first colour-change agent is an activatable diacetylene capable of giving rise to at least two different colours, wherein the second colour-change agent comprises a thermal acid generator and a yellow leuco dye and is capable of giving rise to at least one different colour than achievable with the first colour change agent, and wherein the second colour-change agent is capable of giving rise to the colour yellow.

14. The substrate according to claim 13, further comprising an energy-absorbing agent.

15. The substrate according to claim 14, wherein the energy absorbing agent absorbs radiation having a wavelength in the range 700 nm to 2500 nm.

* * * * *